Re. 15,727

Reissued Dec. 4, 1923.

UNITED STATES PATENT OFFICE.

PERCY BROADBENT CROSSLEY, OF CALCUTTA, INDIA.

VITREOUS PRODUCT AND PROCESS FOR THE MANUFACTURE THEREOF.

No Drawing. Original No. 1,394,973, dated October 25, 1921, Serial No. 326,917, filed September 27, 1919. Application for reissue filed April 3, 1922. Serial No. 549,302.

*To all whom it may concern:*

Be it known that I, PERCY BROADBENT CROSSLEY, a subject of His Majesty King George V (whose address is c/o Messrs. Hoare Miller & Company, 5 Fairlie Place, Calcutta, British India), consulting chemist and metallurgist, have invented a Vitreous Product and Process for the Manufacture Thereof, of which the following is a specification.

The object of my invention is to utilize waste micas, asbestos and the like for the manufacture of glass.

It is well known that micas, asbestos and the like are very wasteful minerals to mine, and that over 90% of the mica is rejected during the subsequent operations of dressing, cleaning, etc. Much mica has to be rejected owing to impurities, cracks, cross-grain or twining.

The object of this invention is mainly to use these otherwise waste micas and to utilize waste asbestos or the like minerals. It will be quite understood, however, that I need not confine myself to the waste materials only.

The value of mica for industrial purposes depends upon one or a combination of its properties of flexibility, transparency, non-fusibility, non-conductibility with respect to heat and electricity, etc. Its usefulness is rather limited owing to its fragile and laminated nature. As an example of one of the defects due to the latter may be mentioned the bad effect due to the adsorption of water and oil.

The present invention is to utilize these waste, impure or otherwise commercially unsuitable materials for the production of a substance which may be equal in value to the best micas as far as the electrical, heat insulating properties, transparency, etc., are concerned, but which will have, under certain conditions, other valuable properties in addition to those possessed by the natural minerals. This new substance may be used for any purpose for which the natural pure minerals. This new substance may be used vantages in that it may be wrought into any desired shape or form by rolling, forging, extruding, molding, casting or welding. Articles made from the new product may be machined. This new material may be made to adhere tenaciously to metals.

In carrying out my process micaceous minerals, asbestos or the like are suitably sorted or graded. These materials are then disintegrated. I generally crush the products to a powder, but, in the case of mica, I may if I prefer use it in the shape of fine scales or flakes, or even as small films or splittings.

The disintegration may be performed by any of the ordinary processes. In the case of the treatment of mica, films or splittings can be produced by subjecting the natural blocks, plates, etc., to the repeated application of heat followed by rapid cooling, i. e., quenching in water or other fluid.

After disintegration has been accomplished to the desired extent the impure varieties of the micaceous minerals, waste micas, asbestos or the like may be subjected to chemical or other processes to remove the impurities.

These impurities, which in the case of micas are almost invariably only present on the surfaces of the films, flakes or particles of the powder, may be converted into a soluble form and removed from the material by lixiviation with water or with weak solutions of acids, alkalis or salts, without deleteriously affecting the minerals. The material may be subsequently washed and dried.

In certain localities micas are found in a powdered or disintegrated form of very pure quality which may not need any mechanical manipulation or further purification before being used in my process.

These materials are then intimately mixed with a solid solvent, the nature and properties, including color, of which are modified to suit the special requirements the finished product has to meet.

As examples of the solvents used may be mentioned glass, made by the admixture of powdered glass with suitable active substances, such as cobalt, lead or other metallic oxids, boric acid, metallic borates or boro-silicates and the like, having a melting point lower than the temperature at which micaceous minerals, asbestos or the like begin to effloresce or part with their water of hydration, the temperature ranging from that required to melt ordinary glass to one below that at which the natural silicates, such as mica or asbestos begin to change their physical and chemical characteristics, a temperature up to about 900° centigrade being employed.

According to the present invention the mixture is then heated in a suitable furnace usually for a considerable length of time at a temperature below that at which the micaceous constituents will begin to efflorescence, so as to obtain the desired incorporation of the solvent with the materials whereby the mixture becomes, either wholly or partially, transformed into a viscid mass. The mixture may then be subjected to mechanical manipulation as may be found desirable to form it into its final shape, such as rolling, forging, etc.

After the micaceous constituents have been heated for some time, as above described, they dissolve and form a solid solution. This solid solution can thereafter, if so desired, be raised to a higher temperature than that at which the micaceous constituents generally effloresce without suffering decomposition.

I may if I prefer add an excess of micaceous constituents beyond that which would be sufficient to form a saturated solution. Such excess modifies the physical properties of the resultant product, and it would appear that such excess is desirable if the resultant product is to be capable of being machined with ease.

The temperature and the length of time the mixture is kept in the furnace depends upon the proportion of the solvent used in the mixture, and also upon the chemical composition of the same.

It is generally only necessary to heat the mixture to slightly above the temperature at which the solvent will melt. If the proportion of the micaceous constituents in the mixture is large it is generally desirable to raise the temperature slightly higher than when the proportion of these constituents is small.

By a suitable modification of the proportions of the mixture and in the choice of the chemical composition of the solvent, products having the desired properties can be obtained.

If desired I may heat the substance until the mass becomes liquefied and can be cast into molds.

From the above it will be recognized that my process bears a close analogy to certain processes used in the manufacture of alloys composed of metals having widely different melting points, such as zinc and iron, which metals form a solid solution without the iron, which melts at a much higher temperature than zinc, being raised sufficiently high in temperature to cause it to liquefy.

By using a suitable quality of mica and a colorless solvent glass, a transparent product can be obtained. By using coloring agencies the glass produced may be of any color desired. Such glasses can be used for many purposes for which ordinary glass is used. My product may be transparent, semi-transparent or opaque as desired. The semi-transparent and opaque varieties have also a very large commercial field of usefulness and can be used in the construction of electrical machinery, electrical appliances, or as heat insulating substances, and for general use. As this material can be made to adhere tenaciously to metals it may be used for the insulation of electric conductors. Being non-combustible, and also capable of being colored to any desirable tint, and formed into any desired shape, this material has a large field of usefulness in the domestic arts.

Its capacity for being machined adds enormously to the adaptability of the material for industrial purposes.

It will be quite understood that I do not confine myself to the exact methods described above, but desire to be free to use any reasonable modification of the same. For instance, I may if I prefer use a molten bath of the solvent into which I could feed the micaceous minerals or the like, the mass being agitated as necessary. Alternately, I may add the molten solvent to the micaceous minerals and allow it to act upon the same, suitable time being given for the reactions to be completed before subjecting the mass to subsequent mechanical manipulation. Any combination of these three methods might be used.

I may, however, use other substances in the place of powdered glass as the base of my solvent glass. For instance, any natural or artificial silicate might be used which is found to be suitable. I might use mica, particularly in the form of waste products from my own processes.

Instead of the solvent glass made by the above process, I may use other solvents, such as certain fluxes or glasses used in the manufacture of ceramic ware, which may be suitable for this purpose.

Such natural silicates as mica and asbestos have been found to fulfill the purposes of my invention, and I have accordingly named these silicates in the description of my invention, but their recital is not intended to exclude such other natural silicates as may possess similar chemical and physical properties, and be capable of combining with a suitable solvent to produce the stated results. The term "natural silicates," used in the claims, is intended to include any natural silicates having the characteristics here pointed out.

Having now particularly described and ascertained the nature of my said invention and the manner in which the same is to be performed, I declare that what I claim is:

1. The method of manufacturing glass which comprises heating a mixture of vitreous material and a silicate of high fusibility to a temperature between that at which said vitreous material melts and that at which the silicate begins to lose its water of hydration; whereby the silicate is dissolved in the molten vitreous material.

2. The method of manufacturing glass which comprises heating a mixture of glass and a silicate of high fusibility to a temperature between that at which the glass melts and that at which the silicate begins to lose its water of hydration; whereby the silicate is dissolved in the molten glass.

3. The method of manufacturing glass which comprises heating a mixture of glass and a micaceous material of high fusibility to a temperature between that at which the glass melts and that at which the micaceous material begins to lose its water of hydration; whereby the micaceous material is dissolved in the molten glass.

4. The method of manufacturing glass which comprises heating a mixture of glass and comminuted mica to a temperature between that at which the glass melts and that at which the mica begins to lose its water of hydration; whereby the mica is dissolved in the molten glass.

5. The method of manufacturing glass which comprises dissolving a natural silicate of high fusibility in molten vitreous material and maintaining the temperature below that at which the said silicate effloresces.

6. The method of manufacturing glass which comprises dissolving a natural silicate of high fusibility in molten glass and maintaining the temperature below that at which said silicate effloresces.

7. The method of manufacturing glass which comprises dissolving mica in molten glass and maintaining the temperature below that at which the mica effloresces.

8. The method of manufacturing a vitreous product which comprises heating a mixture of vitreous material and a silicate of high fusibility to a temperature between that at which said vitreous material melts and that at which the silicate begins to lose its water of hydration; whereby the silicate becomes intimately incorporated, by chemical action, with the vitreous material.

9. The method of manufacturing a vitreous product which comprises heating a mixture of vitreous material and a natural silicate of high fusibility to a temperature between that at which the vitreous material melts and that at which the silicate begins to lose its water of hydration; whereby the silicate becomes intimately incorporated, by chemical action, with the vitreous material.

10. The method of manufacturing a vitreous product which comprises heating a mixture of vitreous material and a micaceous mineral to a temperature between that at which the vitreous material melts and that at which the mineral loses a substantial amount of its water of hydration; whereby the said mineral becomes intimately incorporated, by chemical action, with the vitreous material.

11. The method of manufacturing a substantially homogeneous product which comprises heating a vitreous material and a natural silicate of high fusibility to such a temperature that the vitreous material is melted and the silicate is intimately incorporated with the vitreous material while still retaining substantially all of the silicate's water of hydration.

12. An electrical insulating material formed of a product containing a natural silicate of high fusibility intimately incorporated with a vitreous material by solution in the vitreous material of a portion of the silicate, and characterized by its toughness, workability and non-fissility.

13. A substantially homogeneous vitreous product containing a natural silicate of high fusibility and which is hard, tough and strong at ordinary temperatures and plastic at temperatures at least as low at 900° C.

14. A substantially homogeneous electrical insulating material formed of a vitreous product containing a natural silicate of high fusibility, and which is hard, tough and strong at ordinary temperatures and plastic at temperatures at least as low at 900° C.

15. A substantially homogeneous product containing a disintegrated natural silicate of high fusibility intimately incorporated with a vitreous material by solution in the vitreous material of a portion of the said silicate, and characterized by its high electrical insulating qualities, toughness, workability and non-fissility.

16. An electrical insulating material, formed of a substantially homogeneous product containing a disintegrated natural silicate of high fusibility intimately incorporated with a vitreous material by solution in the vitreous material of a portion of the said silicate and characterized by its toughness, workability and non-fissility.

17. A product which is a substantially homogeneous mixture and compound of a silicate of high fusibility and a vitreous material, and characterized by its high electrical insulating qualities, toughness, workability and non-fissility.

18. A substantially homogeneous product containing a silicate of high fusibility, substantially all of whose water of hydration is retained and which silicate is distributed uniformly throughout a polysilicate formed by the reaction of said silicate and a solvent.

19. An electrical insulating material, formed of a substantially homogeneous product containing a solvent, and a silicate of high fusibility, substantially all of whose water of hydration is retained and which silicate is distributed uniformly throughout a poly-silicate formed by the reaction of said silicate and solvent.

20. A substantially homogeneous product containing mica intimately incorporated with a vitreous material by solution in the vitreous material of a portion of the mica, and characterized by its high electrical insulating qualities, toughness, workability and non-fissility.

21. A substantially homogeneous product containing mica substantially all of whose water of hydration is retained and which is distributed uniformly throughout a poly-silicate formed by the reaction of the mica and a solvent.

22. A vitreous product comprising a glass fusible below the temperature at which mica loses water of hydration, and small particles of mica imbedded therein in sufficient quantity to render the product susceptible of mechanical manipulation when heated to a viscid state, and being capable of adhering tenaciously to metals.

23. A substantially homogeneous product, comprising a vitreous material containing boron as a constituent, fusible below the temperature at which mica loses water of hydration, and small particles of mica imbedded therein in sufficient quantity to render the product machinable, said product being moldable when heated to a viscid state.

24. The method of manufacturing a vitreous product which comprises heating a mixture of vitreous material and a micaceous mineral, the amount of mineral being in excess of that sufficient to form a saturated solution, to a temperature between that at which the vitreous material melts and that at which the mineral loses a substantial amount of its water of hydration; whereby the said mineral becomes intimately incorporated by chemical action with the vitreous material.

25. An electrical insulating material formed of a product containing a natural silicate of high fusibility intimately incorporated with a vitreous material by solution in the vitreous material of a portion of the silicate, the amount of silicate being in excess of that sufficient to form a saturated solution, and characterized by its toughness, workability and nonfissility.

PERCY BROADBENT CROSSLEY.

Certificate of Correction.

It is hereby certified that in Reissue Letters Patent No. 15,727, granted December 4, 1923, upon the application of Percy Broadbent Crossley, of Calcutta, India, for an improvement in "Vitreous Products and Processes for the Manufacture Thereof," an error appears in the printed specification requiring correction as follows: Page 1, strike out present line 48 and insert instead *minerals are used. It possesses other ad-;* and that the said Letters Patent should be read with this correction therein that the same may conform to the record of the case in the Patent Office.

Signed and sealed this 12th day of February, A. D., 1924.

[SEAL.]

KARL FENNING,
*Acting Commissioner of Patents.* a poly-silicate formed by the reaction of said silicate and solvent.

20. A substantially homogeneous product containing mica intimately incorporated with a vitreous material by solution in the vitreous material of a portion of the mica, and characterized by its high electrical insulating qualities, toughness, workability and non-fissility.

21. A substantially homogeneous product containing mica substantially all of whose water of hydration is retained and which is distributed uniformly throughout a poly-silicate formed by the reaction of the mica and a solvent.

22. A vitreous product comprising a glass fusible below the temperature at which mica loses water of hydration, and small particles of mica imbedded therein in sufficient quantity to render the product susceptible of mechanical manipulation when heated to a viscid state, and being capable of adhering tenaciously to metals.

23. A substantially homogeneous product, comprising a vitreous material containing boron as a constituent, fusible below the temperature at which mica loses water of hydration, and small particles of mica imbedded therein in sufficient quantity to render the product machinable, said product being moldable when heated to a viscid state.

24. The method of manufacturing a vitreous product which comprises heating a mixture of vitreous material and a micaceous mineral, the amount of mineral being in excess of that sufficient to form a saturated solution, to a temperature between that at which the vitreous material melts and that at which the mineral loses a substantial amount of its water of hydration; whereby the said mineral becomes intimately incorporated by chemical action with the vitreous material.

25. An electrical insulating material formed of a product containing a natural silicate of high fusibility intimately incorporated with a vitreous material by solution in the vitreous material of a portion of the silicate, the amount of silicate being in excess of that sufficient to form a saturated solution, and characterized by its toughness, workability and nonfissility.

PERCY BROADBENT CROSSLEY.

Certificate of Correction.

It is hereby certified that in Reissue Letters Patent No. 15,727, granted December 4, 1923, upon the application of Percy Broadbent Crossley, of Calcutta, India, for an improvement in "Vitreous Products and Processes for the Manufacture Thereof," an error appears in the printed specification requiring correction as follows: Page 1, strike out present line 48 and insert instead *minerals are used. It possesses other ad-;* and that the said Letters Patent should be read with this correction therein that the same may conform to the record of the case in the Patent Office.

Signed and sealed this 12th day of February, A. D., 1924.

[SEAL.]

KARL FENNING,
*Acting Commissioner of Patents.*